United States Patent [19]

Masuda

[11] Patent Number: 5,280,545
[45] Date of Patent: Jan. 18, 1994

[54] IMAGE INFORMATION PROCESSING APPARATUS CAPABLE OF SYNTHESIZING FRONT- AND BACK-SURFACE INFORMATION

[75] Inventor: Ryuichi Masuda, Funabashi, Japan

[73] Assignee: Canon Kabushiki Kaisha, Tokyo, Japan

[21] Appl. No.: 797,163

[22] Filed: Nov. 26, 1991

Related U.S. Application Data

[63] Continuation of Ser. No. 458,392, Dec. 28, 1989, abandoned.

[30] Foreign Application Priority Data

Dec. 29, 1988 [JP] Japan ............... 63-331183
Mar. 7, 1989 [JP] Japan ............... 1-055701

[51] Int. Cl.$^5$ ............................................. G06K 9/36
[52] U.S. Cl. ............................. 382/41; 382/56; 382/62
[58] Field of Search ............... 382/62, 56, 41, 7; 209/583; 359/618; 395/153; 235/379; 364/225.4, 246.4, 966.3

[56] References Cited

U.S. PATENT DOCUMENTS

| | | | |
|---|---|---|---|
| 4,264,808 | 4/1981 | Owens et al. | 235/379 |
| 4,574,395 | 3/1986 | Kato | 382/61 |
| 4,633,506 | 12/1986 | Kato | 382/56 |
| 4,888,812 | 12/1989 | Dinan et al. | 382/7 |
| 4,908,719 | 3/1990 | Nonoyama | 358/494 |
| 4,924,522 | 5/1990 | Bray et al. | 382/56 |
| 5,038,222 | 8/1991 | Saito | 358/401 |
| 5,136,665 | 8/1992 | Inoue | 382/62 |

FOREIGN PATENT DOCUMENTS 0320713 6/1989 European Pat. Off. .

OTHER PUBLICATIONS

Patent Abstracts of Japan, vol. 13, No. 450, Oct. 11, 1989, application publication No. 1-173962.

Primary Examiner—Michael T. Razavi
Assistant Examiner—Andrew W. Johns
Attorney, Agent, or Firm—Fitzpatrick, Cella, Harper & Scinto

[57] ABSTRACT

An image information processing apparatus having an input unit for inputting image information, a synthesizing unit for synthesizing the image information for a plurality of frames inputted from the input unit, and a coding unit for coding the image information synthesized by the synthesizing unit. In particular, the apparatus can synthesize information from the front and the back surfaces of a two-sided original.

7 Claims, 15 Drawing Sheets

_5,280,545_

IMAGE INFORMATION PROCESSING APPARATUS CAPABLE OF SYNTHESIZING FRONT- AND BACK-SURFACE INFORMATION

This application is a continuation of application Ser. No. 07/458,392 filed Dec. 28, 1989, now abandoned.

BACKGROUND OF THE INVENTION

1. Field of the Invention

The present invention relates to an image information processing apparatus such as an image information filing apparatus and facsimile apparatus, having a function to process the image information of a plurality of subjects.

2. Related Background Art

After reading a subject having images on (main) and back surfaces thereof with an image reader such as an image scanner, conventionally the images on the main and back surfaces have been maintained independently from each other.

If the image data on both surfaces are maintained independently, the image data of a subject whose correspondence between the both surface images has an important significance, such as the image data of a check with endorsement, cannot explicitly show such correspondence. The image data of either of the two surfaces may be lost accidentally. The maintenance of such image data becomes cumbersome. Further, in sequential retrieving of only the images on a main surface, it becomes necessary to retrieve the images from every second page, resulting in poor operability.

SUMMARY OF THE INVENTION

It is an object of the present invention to provide an image information processing apparatus eliminating the above disadvantages.

It is another object of the present invention to provide an image information processing apparatus capable of maintaining the images of an original collectively for both main (front) and back surfaces.

It is a further object of the present invention to provide an image information processing apparatus capable of retrieving the images on both main and back surfaces by using a single unit or set of retrieval information.

It is a still further object of the present invention to provide an image information processing apparatus capable of maintaining a plurality of images in the form of images each having both main and back surface images.

The other objects of the present invention will become apparent from the following detailed description when read in connection with the accompanying drawings.

DETAILED DESCRIPTION OF THE PREFERRED EMBODIMENTS

Figure 1:
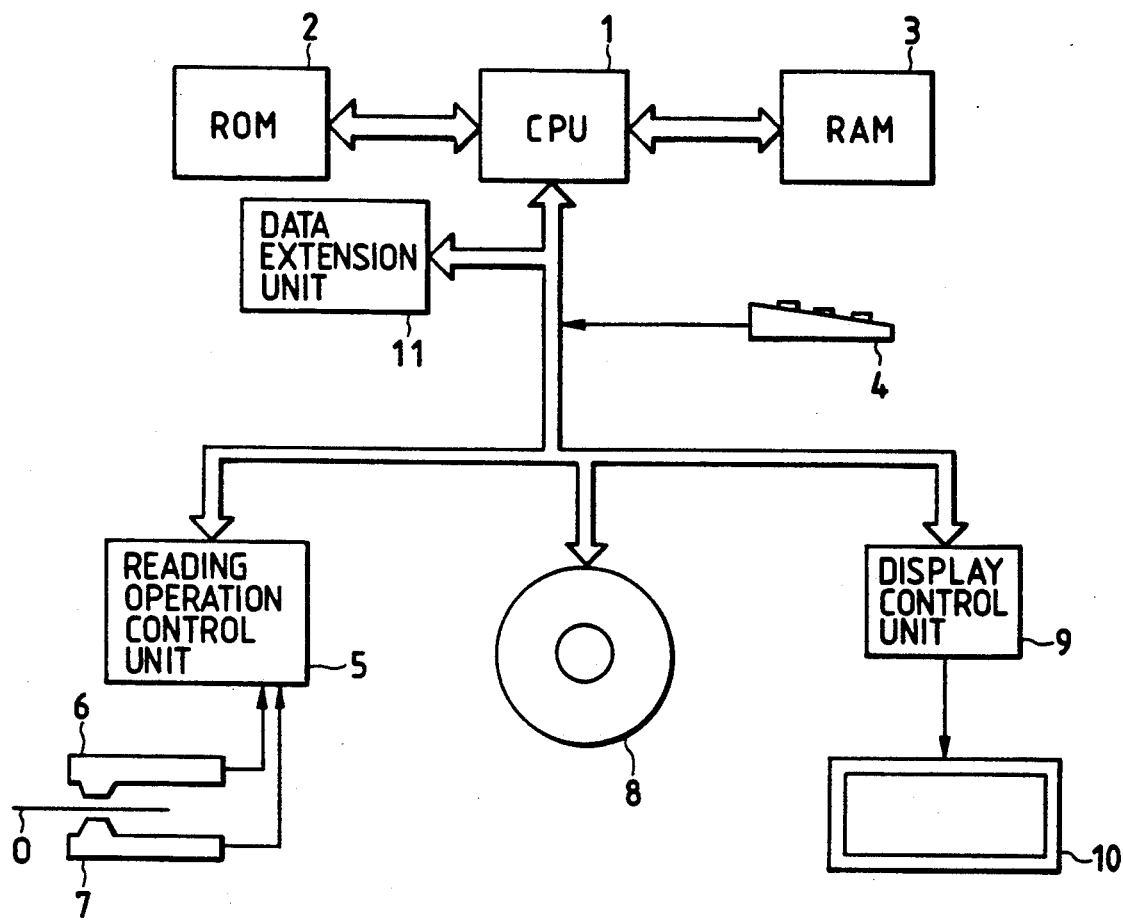
FIG. 1 is a schematic diagram showing the outline of the apparatus according to a first embodiment of this invention.

FIG. 1 is a schematic diagram showing the outline of the apparatus according to the first embodiment of this invention.

A CPU 1 controls the entirely of the apparatus. A ROM 2 stores control programs on which CPU 1 runs, and other data. A RAM 3 is used for configuring retrieval information. A keyboard 4 is used for inputting an image read instruction, a retrieval key word, and the like. An image reader is constructed of a main (front) surface image reading unit 6 having a line image sensor made of a plurality of light receiving elements for reading an image of a subject on the main (front) surface, a back surface image reading unit 7, and a reading operation control unit 5 for controlling the two image reading units 6 and 7. An optical disk 8 stores image data read with the image reader, retrieval data inputted from the keyboard, and other data. A display for displaying inputted keywords or retrieved image information is constructed of a liquid crystal display panel 10 and display control unit 9. The control unit 9 has a VRAM for the development of image data to be displayed. A data extension unit 11 extends compressed image data stored in the optical disk 8.

Figure 3:
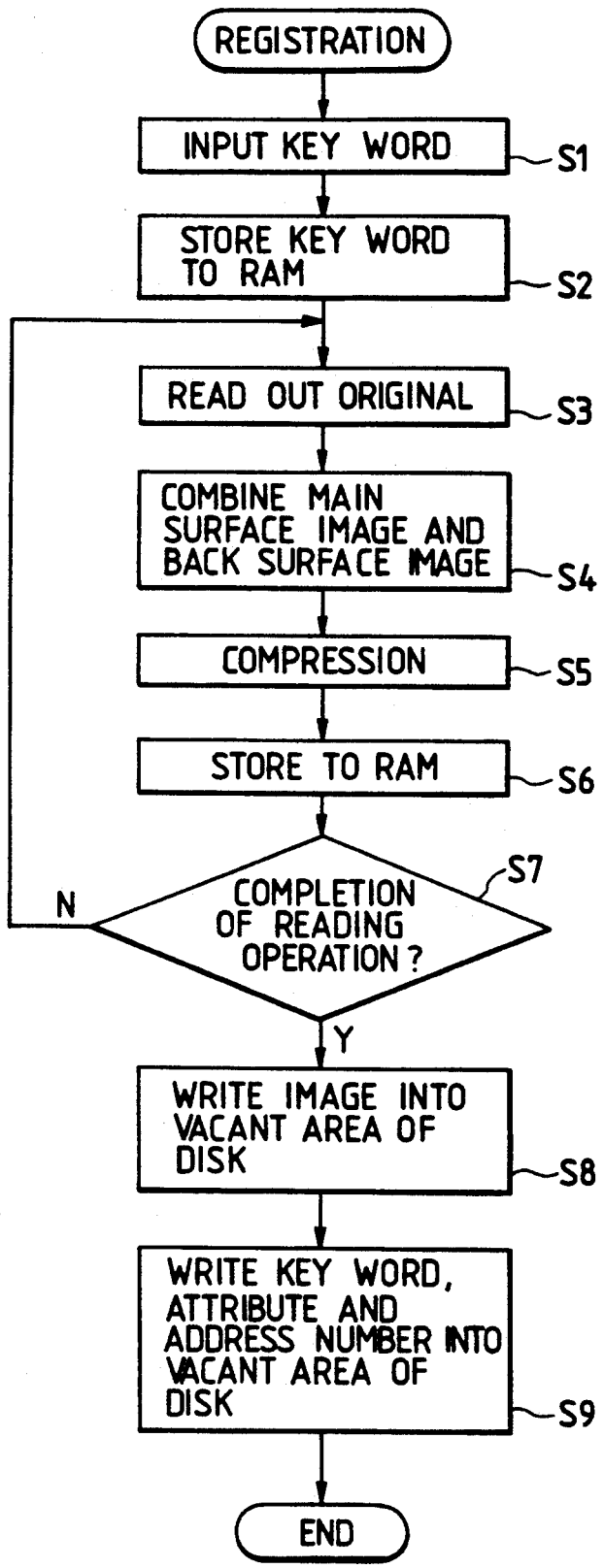
FIG. 3 is a flow chart illustrating an image registration operation.

The operation of the apparatus shown in FIG. 1 will be described with reference to the flow chart shown in FIG. 3.

Figure 2:
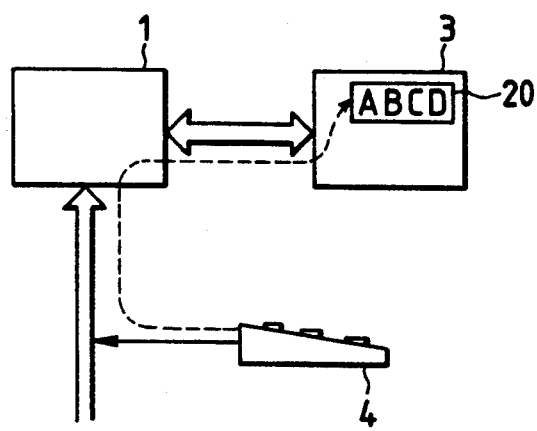
FIG. 2 illustrates how a key word is supplied.

In reading an original with both surface images and storing the image data in the optical disk 8, a key word 20 for the original to be read and stored is first inputted from the keyboard 4 (S1). The inputted key word 20 is temporarily stored in RAM 3 (S2) (refer to FIG. 2). When an image reading operation starts upon input of a read instruction (S3), the image reading units 6 and 7 mounted on the front and back sides of an original transport path read the main and back surface images of the original 0 one line after another and convert the image into analog electric signals which are outputted to the reading operation control unit 5 and display control unit 9. The reading operation control unit 5 synthesizes both surface image signals of one line into one set of signals (S4), compression-codes it (S5), and temporarily stores it in RAM 3 (S6). The display control unit 9 develops the read image data into VRAM for the display thereof on the display panel. Synthesizing both surface image signals is carried out in the following manner.

Figure 4:
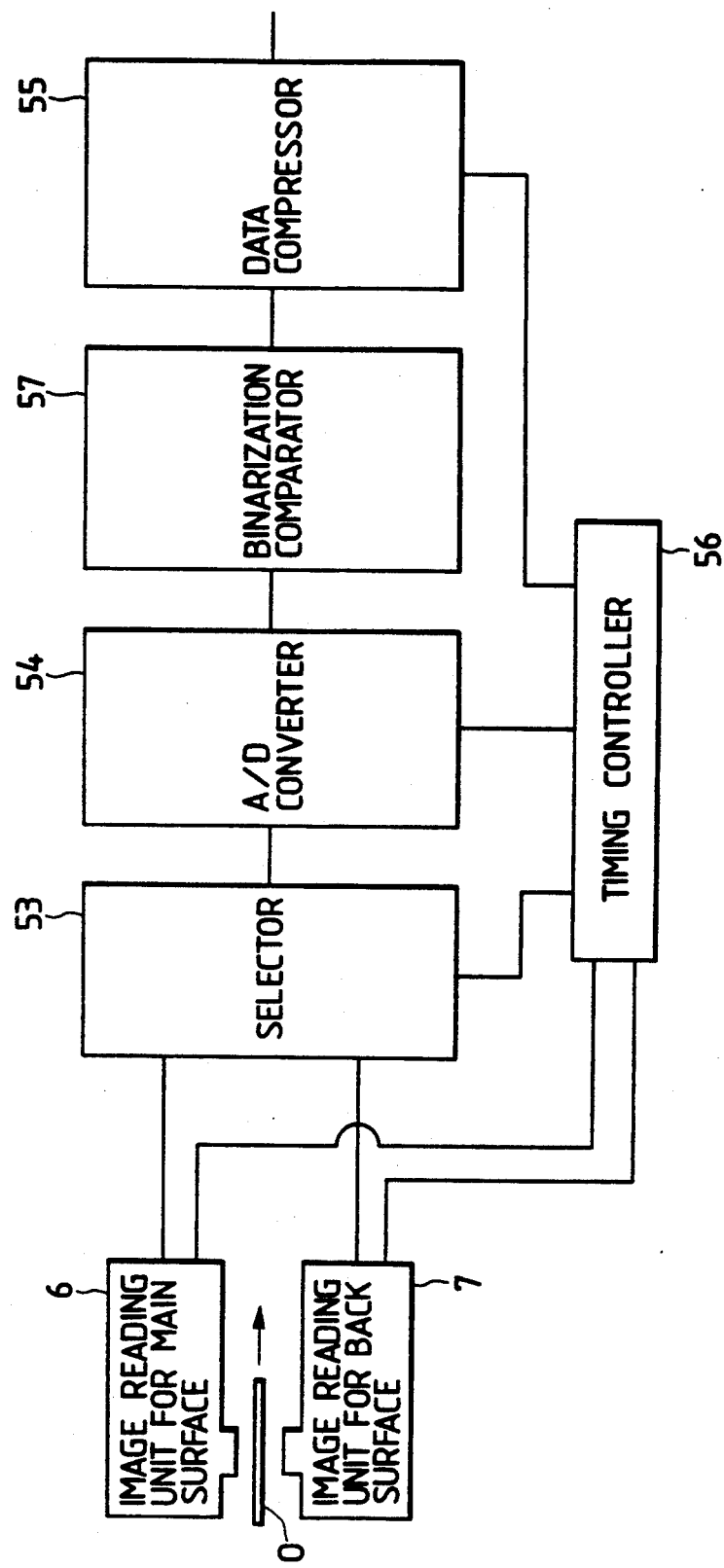
FIG. 4 is a detailed block diagram showing the reading operation control unit.

FIG. 4 is a detailed block diagram of the image reader shown in FIG. 1. A selector 53 selects on the line unit basis the image signals outputted from the image reading units 6 and 7 and outputs them to an A/D converter 54 which in turn converts the inputted analog image signals into a digital image signal having a predetermined number of bits per pixel. A binarization comparator 57 outputs "1" if the digital image signal from the A/D converter 54 is larger than a predetermined value, and "0" if smaller.

When an image reading operation starts, the image reading units 6 and 7 mounted on the front and back sides of the original transport path read the main and back surface images of the original 0 one line after another, and convert the image into analog electric signals which are outputted to the selector 53.

Figure 5A:
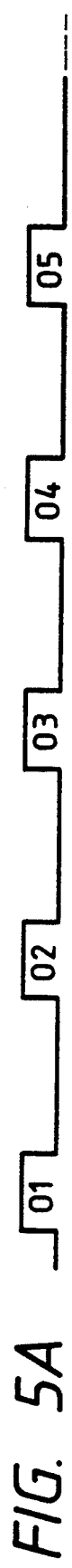
FIGS. 5A to 5D illustrate synthesizing main and back surface images.
Figure 5B:
Figure 5C:
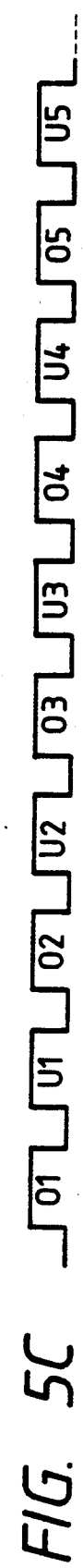

In synchronism with a timing signal generated from a timing controller, the selector 53 selects alternately for each line the front and back surface image signals of the original O supplied from the image reading units 6 and 7, and outputs the image signals to the A/D converter 54. More in particular, main surface image signals O1, O2, . . . as shown in FIG. 5A and back surface image signals U1, U2, . . . as shown in FIG. 5B are synthesized together to obtain unitary sets of image signals as shown in FIG. 5C which are then outputted to the A/D converter 54.

The selector 53 has a buffer for temporarily storing analog signals so that main and back surface image signals can be synthesized synchronously.

At the A/D converter 54, the main and back surface image signals inputted from the selector 53 alternately for each line are converted into digital signals and outputted to the binarization comparator 7.

The binarization converter 57 compares the digital signal value from the A/D converter 54 with the predetermined value and outputs "1" or "0".

A data compressor 55 compresses binarized image signals. The data compressor 55 receives image read start timing and end timing signals from the timing controller 56. During the reading operation, the data compressor 55 compresses the data for each line, and outputs compressed data. This data compression process is carried out using a known MH (Modified Huffman) coding method or another method. The synthesized signal of main and back surface image signals is inputted to the data compressor 55 and compression-coded one line after another. The outputted compression data cannot be separated into main and back surface data easily, and the total data amount can be reduced.

Figure 5D:

It is also possible to control the timing controller 56 so as not to insert a line separation between a main surface one line signal and back surface one line signal, so that the main surface one line signal and back surface one line signal can be combined as a one line signal as shown in FIG. 5D. With this compression decoding, the number of line separation codes can be reduced. Further, it is also possible to use two-dimensional compression coding methods such as the MR coding method, MMR coding method or the like, each having a higher compression rate than the MH Method.

The compressed codes outputted from the data compressor 55 are stored in RAM 3.

Figure 6:
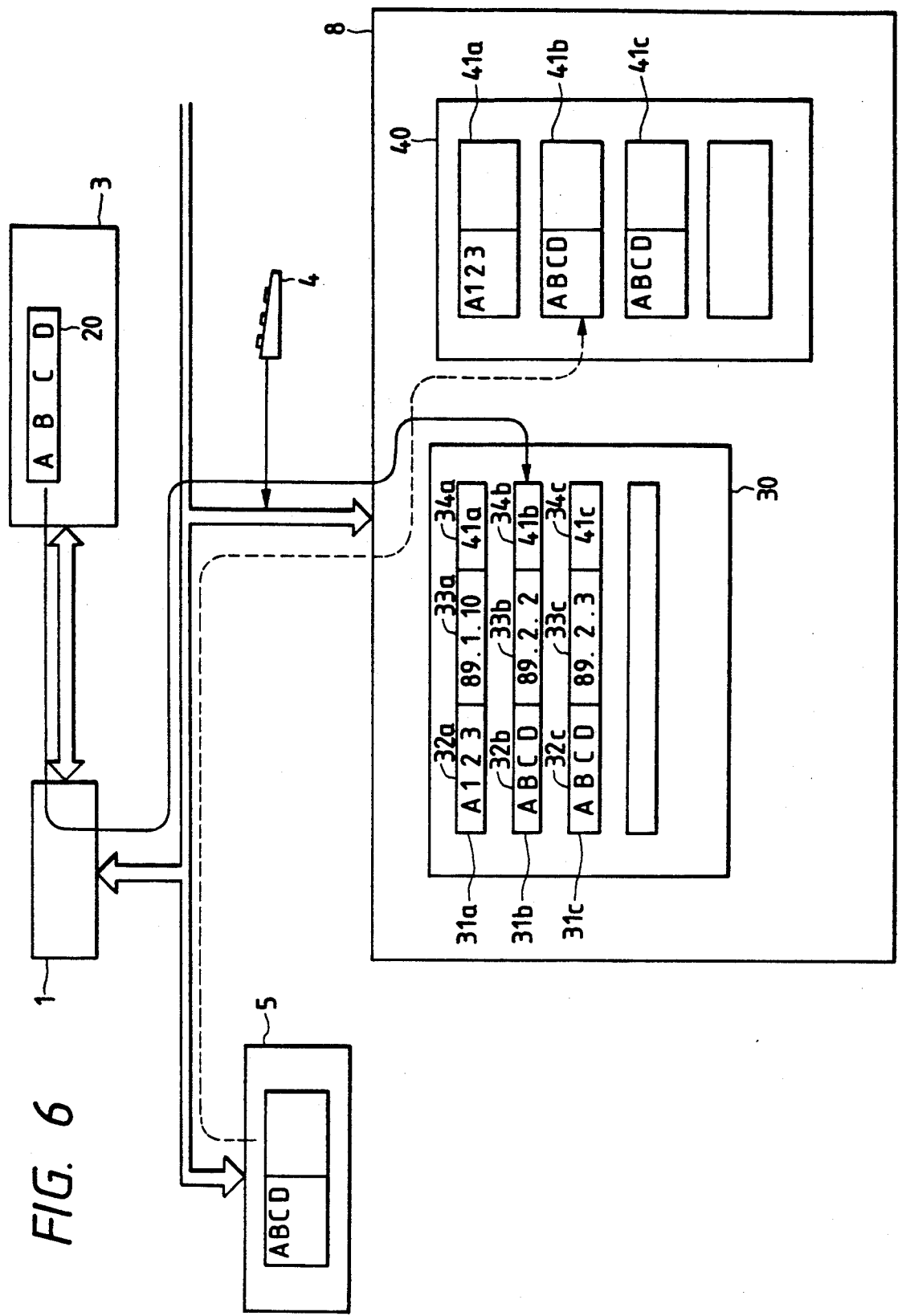
FIG. 6 illustrates how an image is registered.

Upon completion of reading the original image (S7), as illustrated in FIG. 6, CPU 1 receives the compression-coded image information from the reading operation control unit 5, searches for a vacant area (indicated at 41b) in an image information area 40 of the optical disk 8, and writes the image information obtained through synthesizing the main and back surface images onto the optical disk 8 (S8). Also written in another vacant area (indicated at 31b) in a retrieval information area 30 of the optical disk, are the key word 32b stored in RAM 3, the attribute 33b (compression method, registration data and the like) of the image information, and the address 34b of the image information stored area (S9). If a new image is read by using the same key word as was previously used, the later read image is regarded as consecutive with the earlier read image. In this case, the retrieval information of the later read image such as indicated at 31c serves as a pointer to the later read image information with the same key word.

Inputting a key word may be carried out after the image information has been stored in the optical disk.

Figure 7:
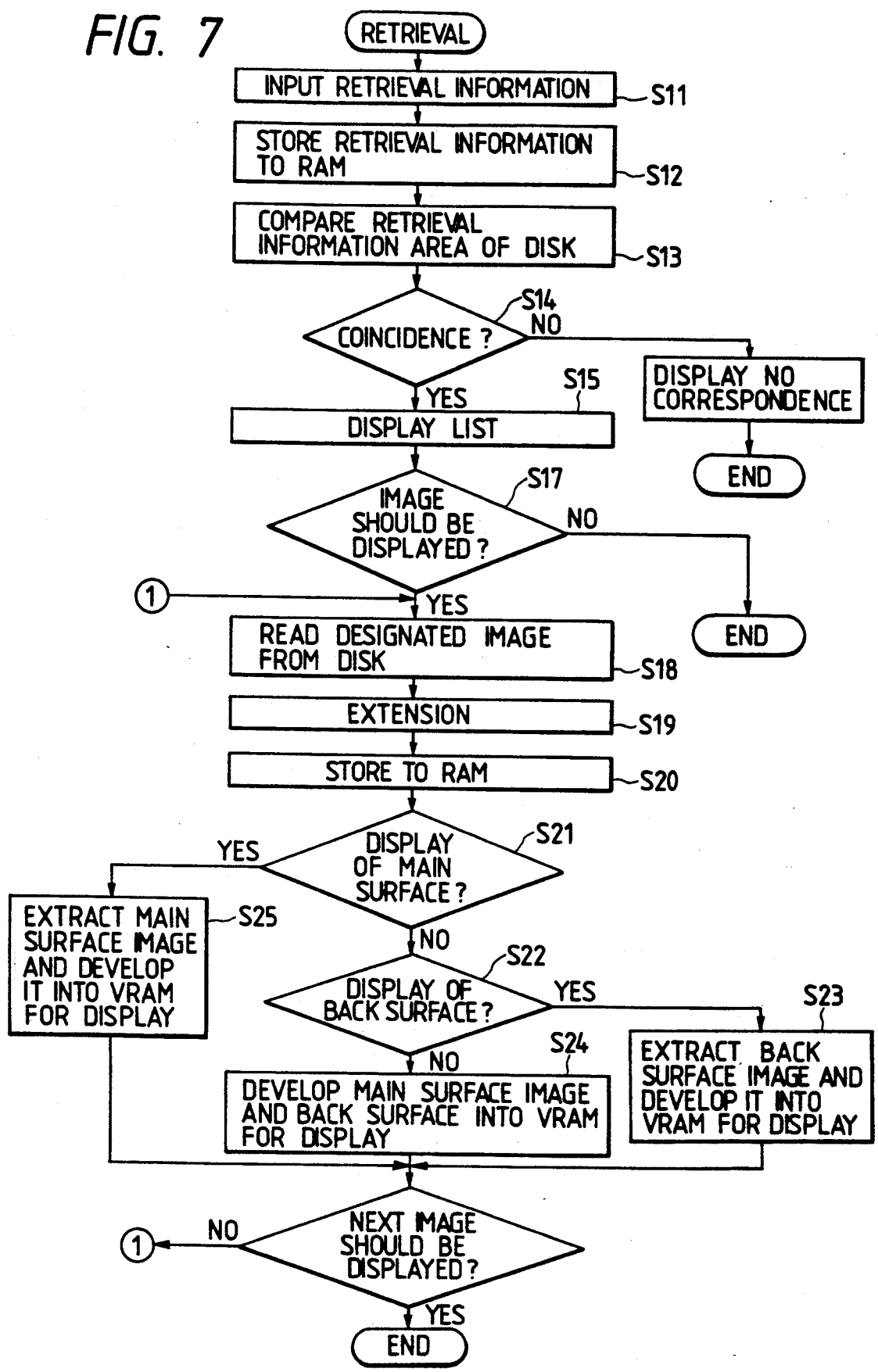
FIG. 7 is a flow chart illustrating an image retrieval operation.
Figure 8:
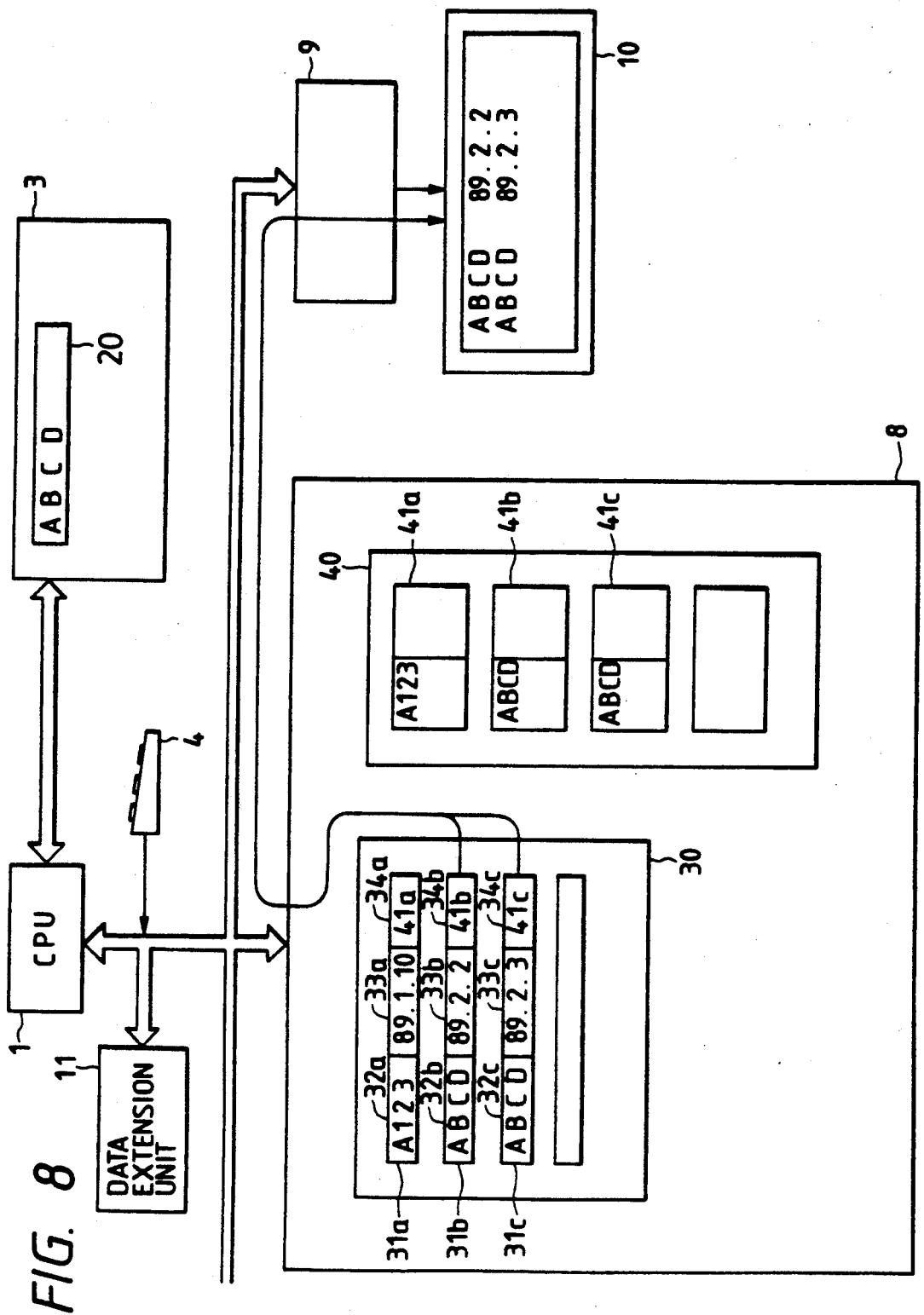
FIG. 8 illustrates how an image is retrieved.

Next, retrieving necessary information from the optical disk 8 will be described with reference to the flow chart shown in FIG. 7. As illustrated in FIG. 8, the retrieval information regarding an image to be retrieved is first inputted from the keyboard 4 (S11). The inputted retrieval information is temporarily stored in RAM 3 (S12). By using the key word 20 stored in RAM 3, CPU 1 searches the key word, same as the key word 20 stored in RAM 3 (S13), from the retrieval information area 30 of the optical disk 8. If there is a coincident key word (S14) the corresponding retrieval information is picked up and sent to the display control unit 9 which in turn sequentially displays the retrieval result information on the liquid crystal panel 10 (S15). In searching out image information, not only a key word, but also another attribute such as a date may be used.

If the retrieved image information is to be accessed (S17), the image information is read from the optical disk by using the address of the image information stored area indicated in the retrieval result information, and is extended and decoded at the data extension unit (S19). The extended image information is stored in RAM (S20), and sent to the display control unit 9 for the development of the image information data into VRAM to display the data on the liquid crystal panel 10. In this case, the read image information including the main and back surface images may be displayed at the same time, or one of the main and back surface images only may be displayed upon designation from the keyboard or automatically. Discriminating between the main and back surface images can be performed by extracting either the front or the back half of the image information of each line. If other image information is to be retrieved, the key word coincident with that of the image information to be retrieved is searched from the retrieval information area, and thereafter the similar operations described above are performed to display the image information.

As described above, an original having both-surface images can be retrieved by using single retrieval information, so that an operator is not required to count the page number as in the case where front and back surface images are separately maintained.

In the above embodiment, the retrieved image information is displayed on the panel of the apparatus. The retrieved image may be transmitted to a remote site via a communication line or may be printed out using a printer. Further, the retrieval information may be inputted not only from the keyboard but also from a remote site via a communication line, or may be read from an external storage unit such as a floppy disk connected to the apparatus.

Figure 9:
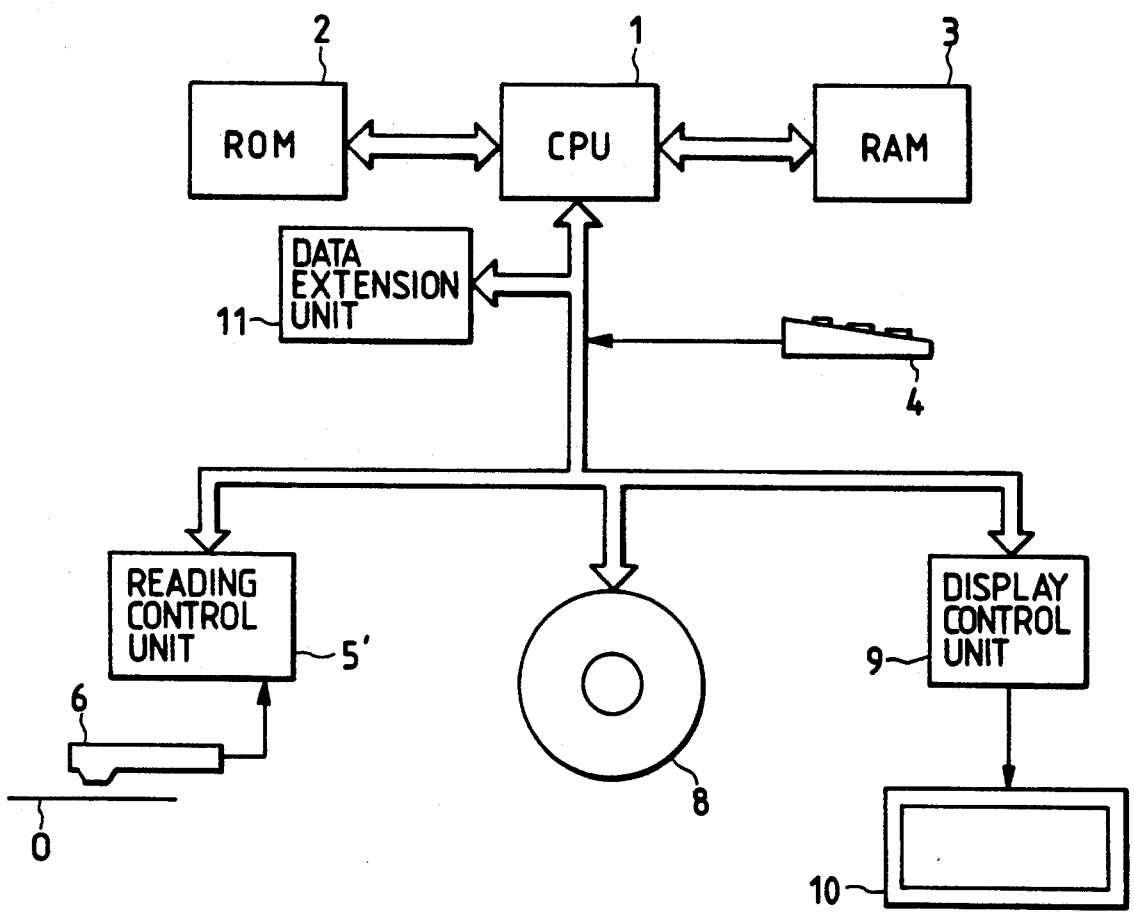
FIG. 9 is a schematic diagram showing the outline of the apparatus according to a second embodiment of this invention.

FIG. 9 is a schematic diagram showing the outline of the apparatus according to the second embodiment of this invention.

Reference numeral 5' represents a reading control unit for an image reader which reads only one surface image of a subject, as different from the first embodiment. The other components are similar to those of the first embodiment, so that the description therefor is omitted.

The operation of the apparatus shown in FIG. 9 will be described below.

Figure 10:
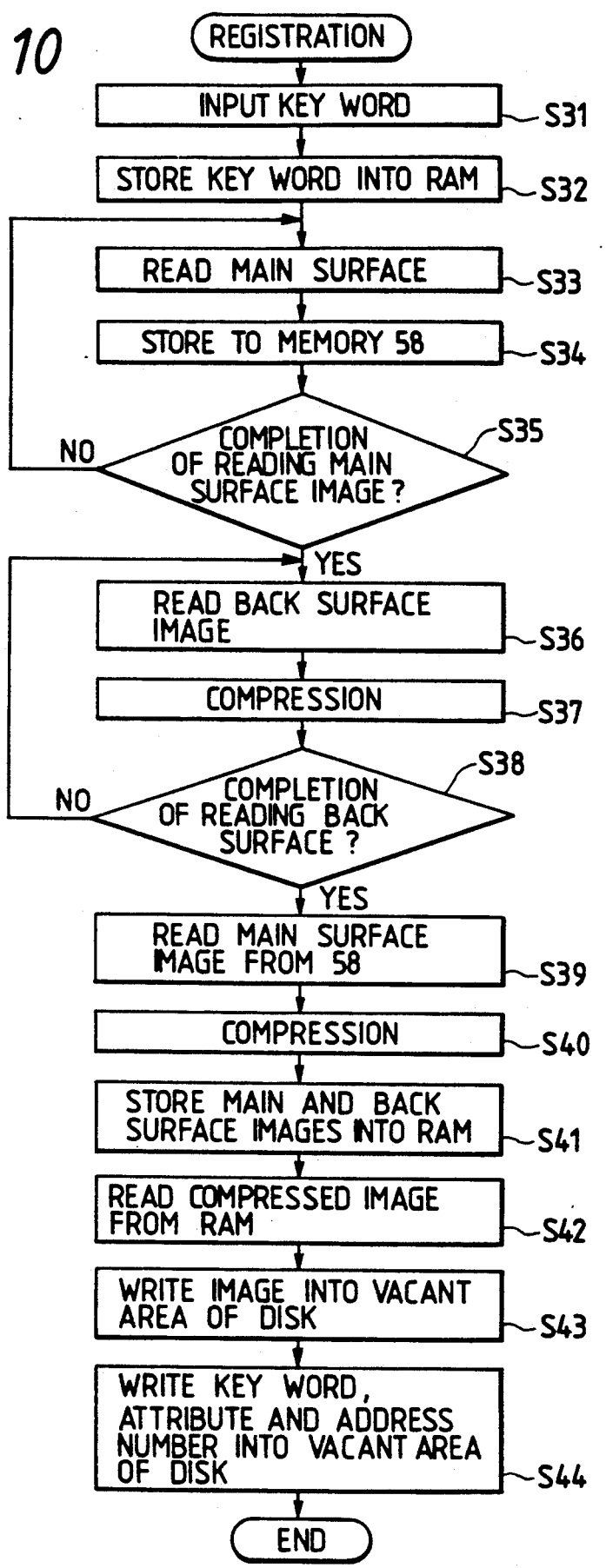
FIG. 10 is a flow chart illustrating an image registration operation.
Figure 11:
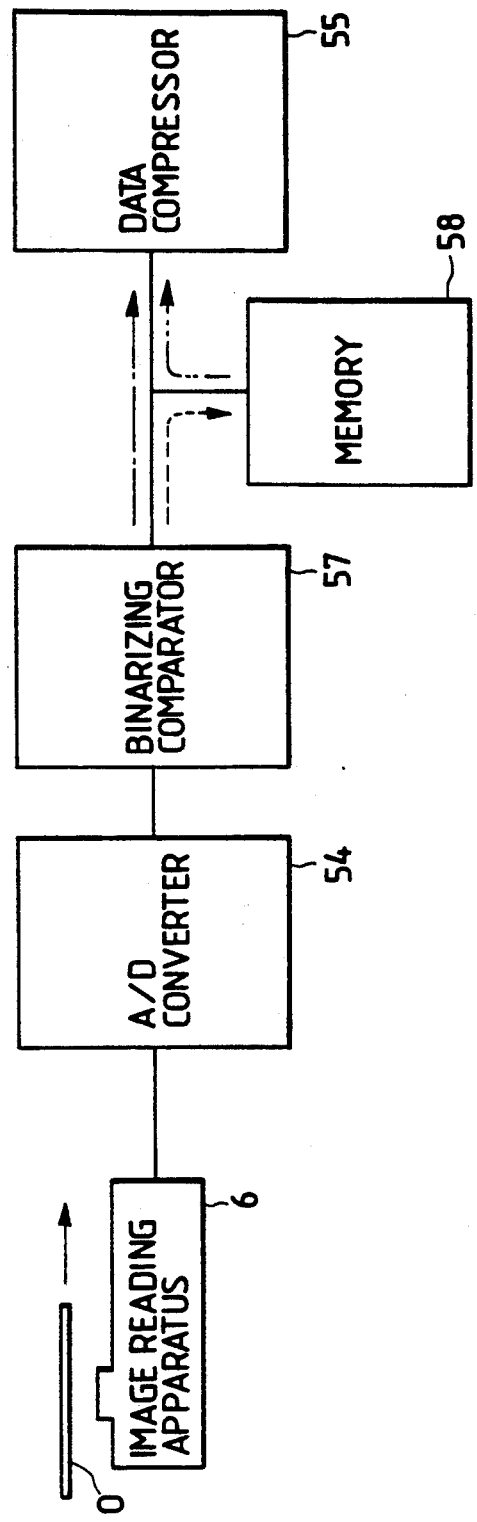
FIG. 11 is a detailed block diagram showing the reading control unit.

Reading an original with both surface images and storing the image data in the optical disk 8, will be described with reference to the flow chart shown in FIG. 10. A key word 20 for the original to be read and stored is first inputted from the keyboard 4 (S31). The inputted key word 20 is temporarily stored in RAM 3 (S32) (refer to FIG. 2). In the image reading operation, the original is set so as to allow the reading unit 6 to read the main surface image thereof. When an image reading operation starts upon input of a read instruction, the image is converted into an analog electric signal one line after another, and sent to the reading control unit 5' which is constructed as shown in FIG. 11. An A/D converter 54 converts an analog image signal inputted from the image reading unit 6 into a digital image signal having a predetermined number of bits per pixel. A binarization comparator 57 outputs "1" if the digital image signal from the A/D converter 54 is larger than a predetermined value, and "0" if smaller. A memory 58 stores binarized image data. A data compressor 55 compresses image data.

First, an original O having both-surface images is transported with the main surface image being set to be read one line after another (S33). The image signal read from the main surface is converted into a digital signal by the A/D converter 54, binarized by the binarization comparator 57, and temporarily stored in the memory 58 as indicated by a broken line (S34).

Figure 12:
FIG. 12 illustrates synthesizing main and back surface images.

Upon completion of reading the main surface image (S35), the same original 0 is transported with the back surface image being set to be read one line after another (S36) The image signal read from the back surface is converted into a digital signal by the A/D converter 54, binarized by the binarization comparator 57, and directly inputted to the data compressor as indicated by a one-dot-dash arrow line shown in FIG. 11 (S37). After the image signal at the last line (1024-th line) of the back surface image has been inputted (S38), the image signals of the main surface are read from the memory 58 (S39) and inputted to the data compressor 55 as indicated at a two-dot-dash arrow line shown in FIG. 11 (S40). More particularly, as shown in FIG. 12, following the image signals of the back surface image U1022, U1023 and U1024, the image signals of the main surface image 01, 02, and 03 are inputted. Even if the surfaces of the original are read separately, image data for both the surfaces can be compressed as a unitary set. The compressed image is stored in RAM 3. All image data may be stored in the memory 58 sequentially in the order of reading, and after the reading operation, the image data may be inputted to the data compressor 55. In this case, the image data can be stored as much as the memory capacity permits. It is therefore possible to handle documents having a plurality of pages without having to pay attention to any missing pages.

After completion of reading the main and back surface images of the original, CPU 1 picks up the compression-coded image information from RAM 3 (S42). In the similar manner to that described in connection with FIG. 6, a vacant area (indicated at 41c) in the image information area 40 of the optical disk 8 is searched, and the image information is written in the vacant area (S43). Also written in another vacant area (indicated at 31c) in the retrieval information area 30 of the optical disk 8, are a key word 32c stored in RAM 3, the attribute (compression method, registration date and the like) of the image information, and the address 34c of the image information stored area (S44).

The operation of retrieving necessary information from the optical disk is the same as described with the first embodiment (FIG. 7), so the description therefor is omitted.

In displaying the stored image information, the main and back surface images can be discriminated on the basis of the count of the number of lines. In this embodiment, a separation between the main and back surface images is decided when the count reaches 1024 lines.

In the second embodiment, the main and back surface images have been compressed while synthesizing both images. The main and back surface images may be compressed independently from each other. This processes will be described briefly in the following.

Figure 13:
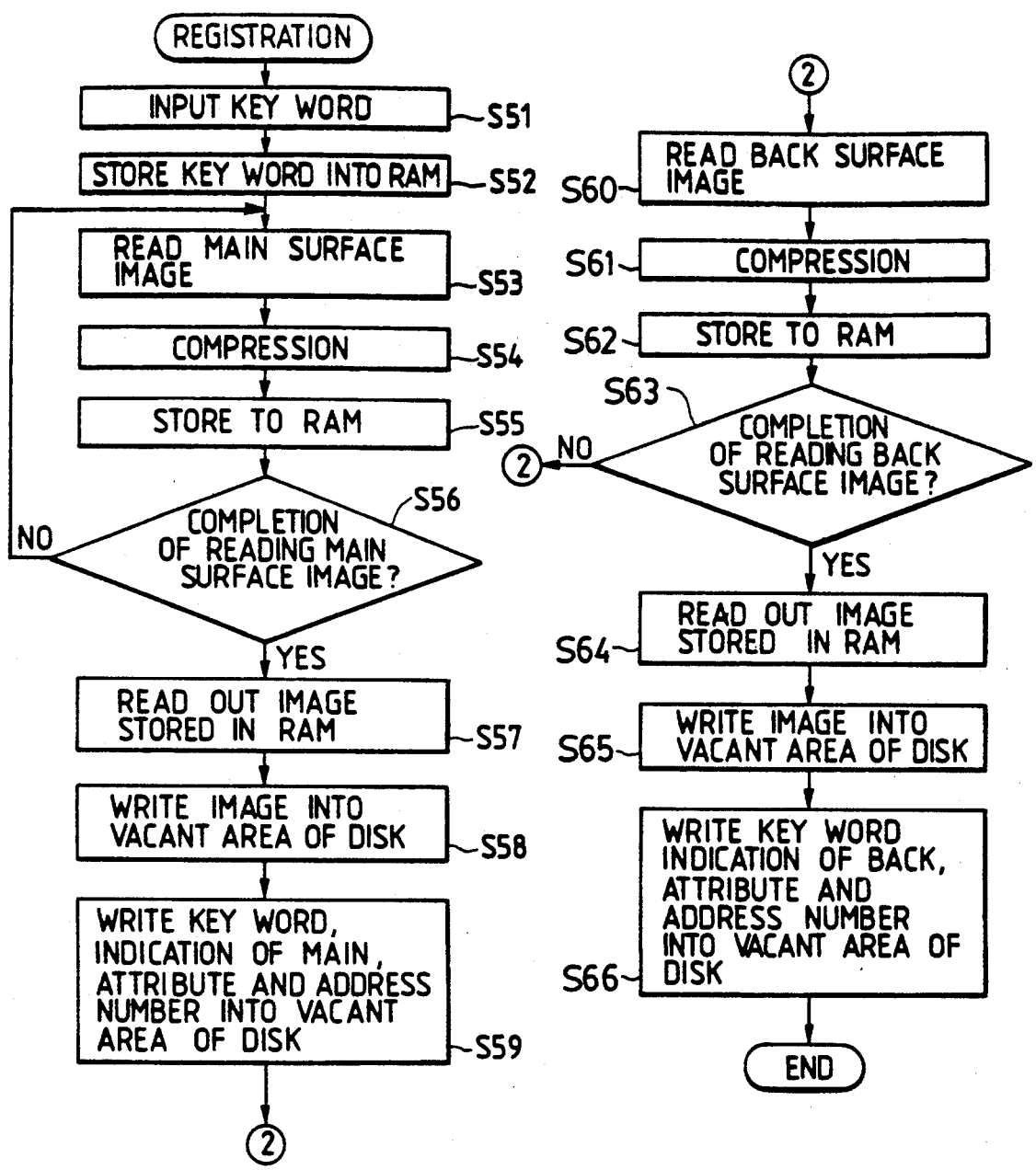
FIG. 13 is a flow chart illustrating an image retrieval operation.

Reading an original with both surface images and storing the image information in the optical disk 8 will be described with reference to the flow chart shown in FIG. 13. A key word 20 for the original to be read and stored is first inputted from the keyboard 4 (S51). The inputted key word 20 is temporarily stored in RAM 3 (S52) (refer to FIG. 2). In the image reading operation, the original is transported with the main surface being set to be read one line after another. The main surface image is then converted into an analog electric signal and outputted to the reading control unit 5'. In the reading control unit 5', the read main surface image signal is converted into a digital signal by the A/D converter 54, binarized by the binarization comparator 57, compression-coded by the data compressor 55 (S54), and stored in RAM 3 (S55). In this case, the memory 55 shown in FIG. 11 is not used.

Figure 14:
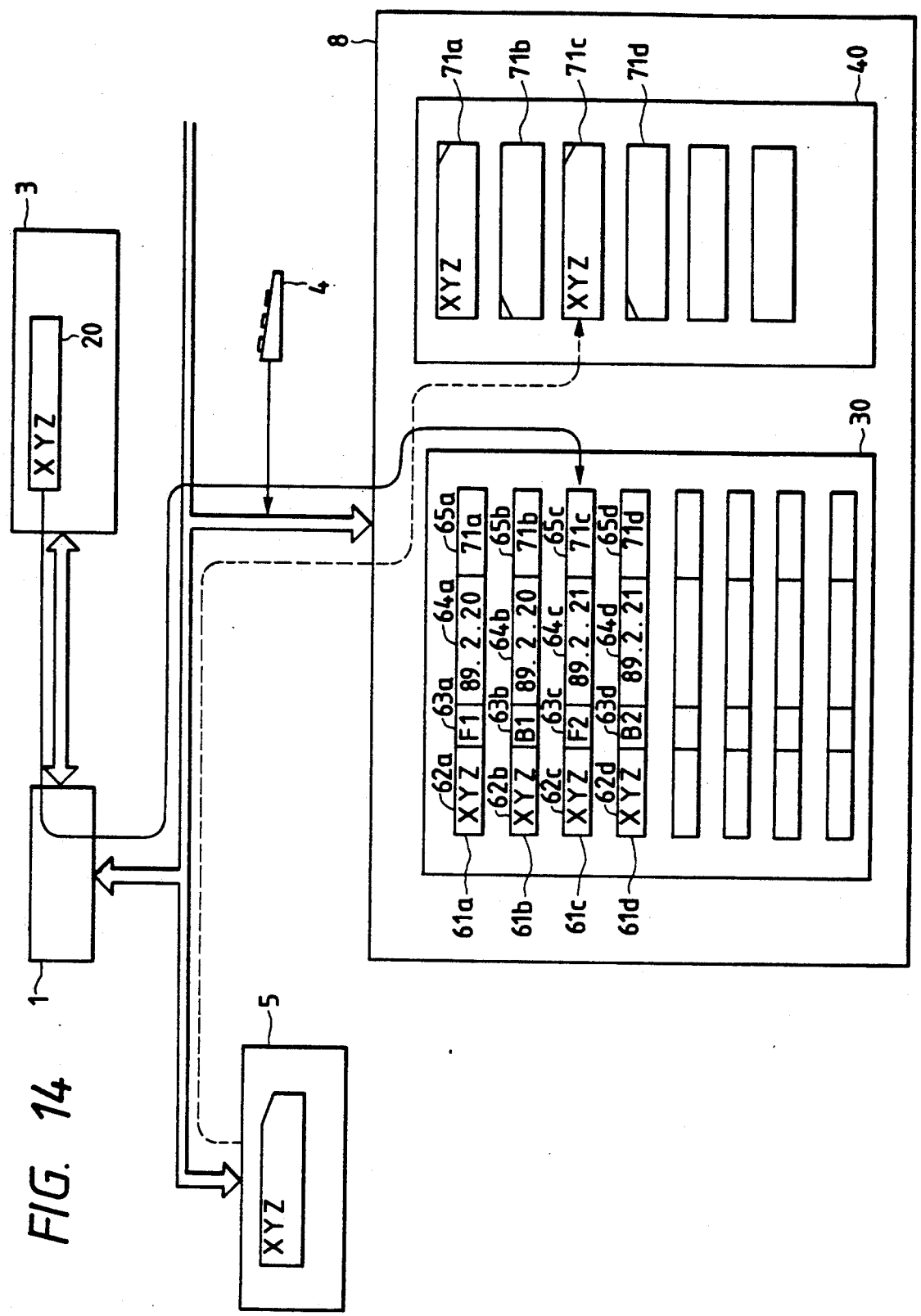
FIG. 14 illustrates how an image is registered.

Upon completion of reading the main surface image of the original (S56), as illustrated in FIG. 14, CPU 1 receives the compression-coded image information from RAM 3 (S57), searches a vacant area (indicated at 71c) in an image information area 40 of the optical disk 8, and writes the image information into the optical disk 8 (S58). Also written in another vacant area (indicated at 61c) in a retrieval information area 30 of the optical disk, are the key word 62c stored in RAM 3, the information 63c (F2 indicates the second page main surface image) representative of a particular page of the main or back surface image for the key word, the attribute 64c (compression method, registration data and the like) of the image information, and the address 71c of the image information stored area (S59). Next, the original is turned upside down to read the back surface image. In the similar manner to the operation for reading the main surface image, the back surface image is stored in the optical disk 8. The image information is stored in an area 71d, whereas the retrieval information is stored in an area 61d (steps S60 to S66 in FIG. 13). Specifically, the consecutively read main and back surface images are affixed with the same retrieval information and with main/back surface discrimination information. For the third surface image, new retrieval information may be inputted.

Figure 15:
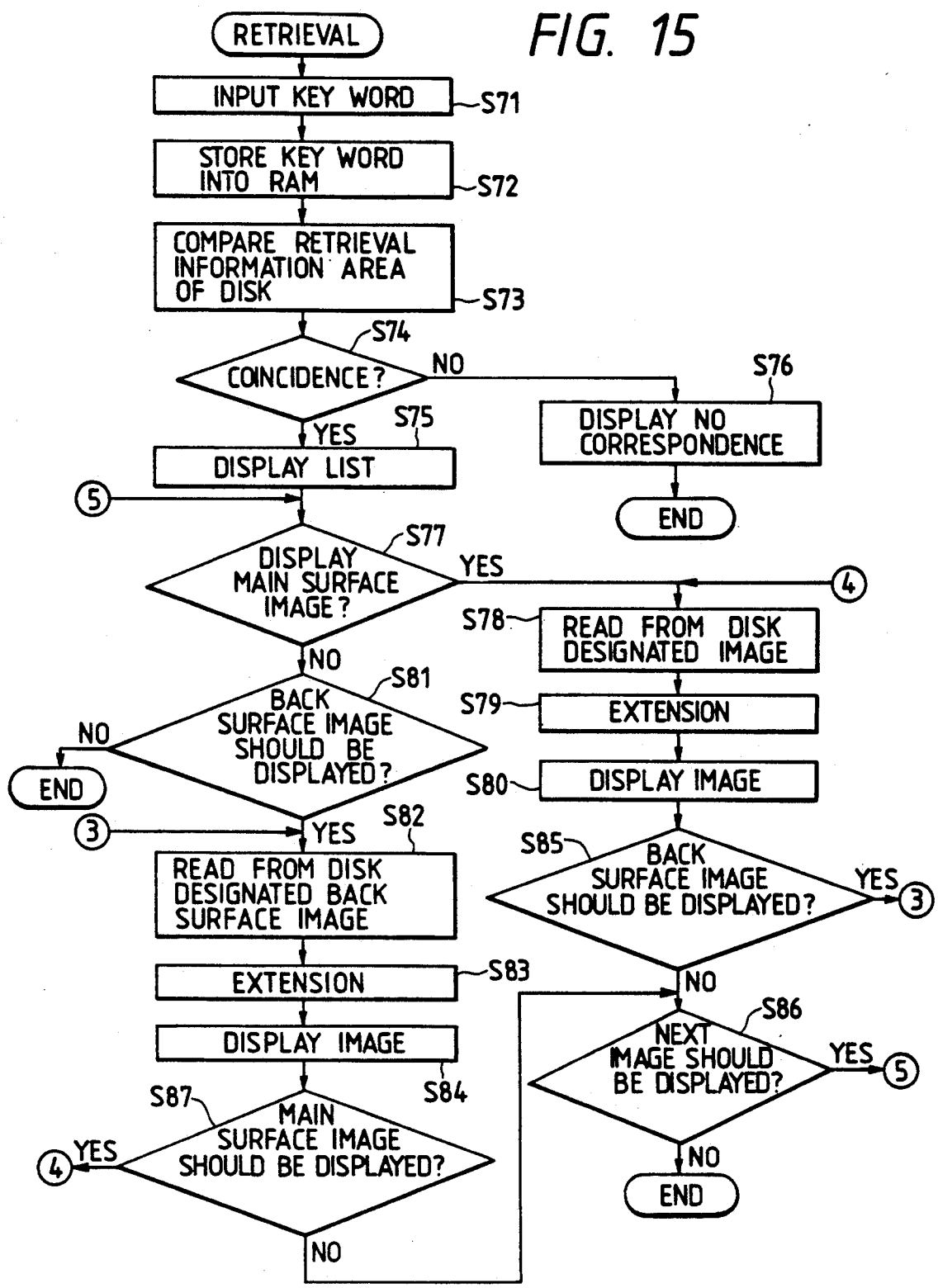
FIG. 15 is a flow chart illustrating an image retrieval operation.
Figure 16:
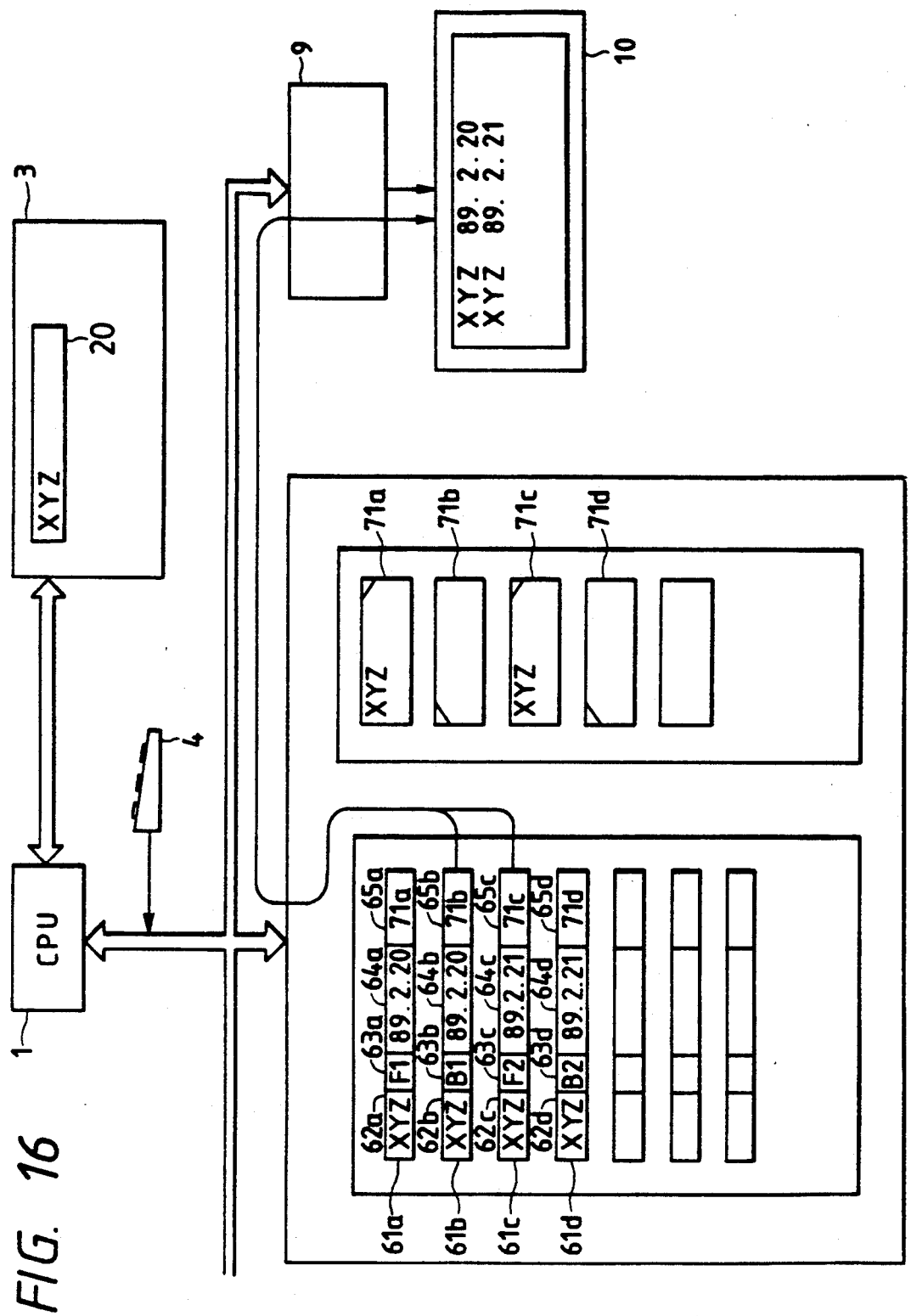
FIG. 16 illustrates how an image is retrieved.

Next, retrieving necessary information from the optical disk 8 will be described with reference to the flow chart shown in FIG. 15. As illustrated in FIG. 16, the retrieval information regarding an image to be retrieved is first inputted from the keyboard 4 (S71). The inputted retrieval information is temporarily stored in RAM 3 (S72). By using the key word 20 stored in RAM 3, CPU 1 searches retrieval information the same as that having the key word 20 stored in RAM 3 and having the main surface discrimination information, from the retrieval information area 30 of the optical disk 8 (S74). If there is coincident retrieval information, it is sent to the display control unit 9 which in turn sequentially displays the retrieval result information on the liquid crystal panel 10 (S75). In searching out image information, not only a key word, but also another attribute such as a date may be used.

If the retrieved image information is to be accessed (S77), the image information is read from the optical disk by using the address of the image information stored area indicated in the retrieval result information (S78), and is extended and decoded at the data extension unit 11 (S79). The extended image information is sent to the display control unit 9 for the development of the image information data into VRAM to display the data on the liquid crystal panel 10 (S80). In this case, which image among the main and back surface images is to be displayed may be previously determined or may be determined upon a designation instruction from the keyboard. If the opposite surface image to the image now being displayed is to be displayed, a main/back surface reverse instruction is inputted from the keyboard (S81, S85). A unit of retrieval information having the same page number and opposite surface is searched out while referring to the fields 63 storing page numbers and main/back surfaces, and in accordance with the searched retrieval information, the corresponding image information is read (S82), extension-decoded (S83) and displayed (S84). If other image information is to be retrieved (S86), a retrieval information having the same key word and main/back discrimination information is searched from the retrieval information area, and thereafter the similar operations described above are performed to display the image information. In this embodiment, retrieval information is provided for each of the main and back surface images so that the image information for both the main and back surfaces can be handled collectively in the similar manner as previously described with the retrieval information management method.

There may be mounted on the image reading unit an apparatus such as a document feeder which can turn upside down an original after reading one surface images of the original. In this case, after transporting an original to read main surface images and store them in the optical disk 8, the following operations can be automatically carried out, the operations including outputting from CPU 1 to the document feeder an original reverse instruction, reading the back surface images, and storing the image information in the optical disk 8. It is therefore not necessary for an operator to pay attention to whether the original is now set facing upward or downward, thereby avoiding an erroneous operation and allowing easier handling.

Figure 17:
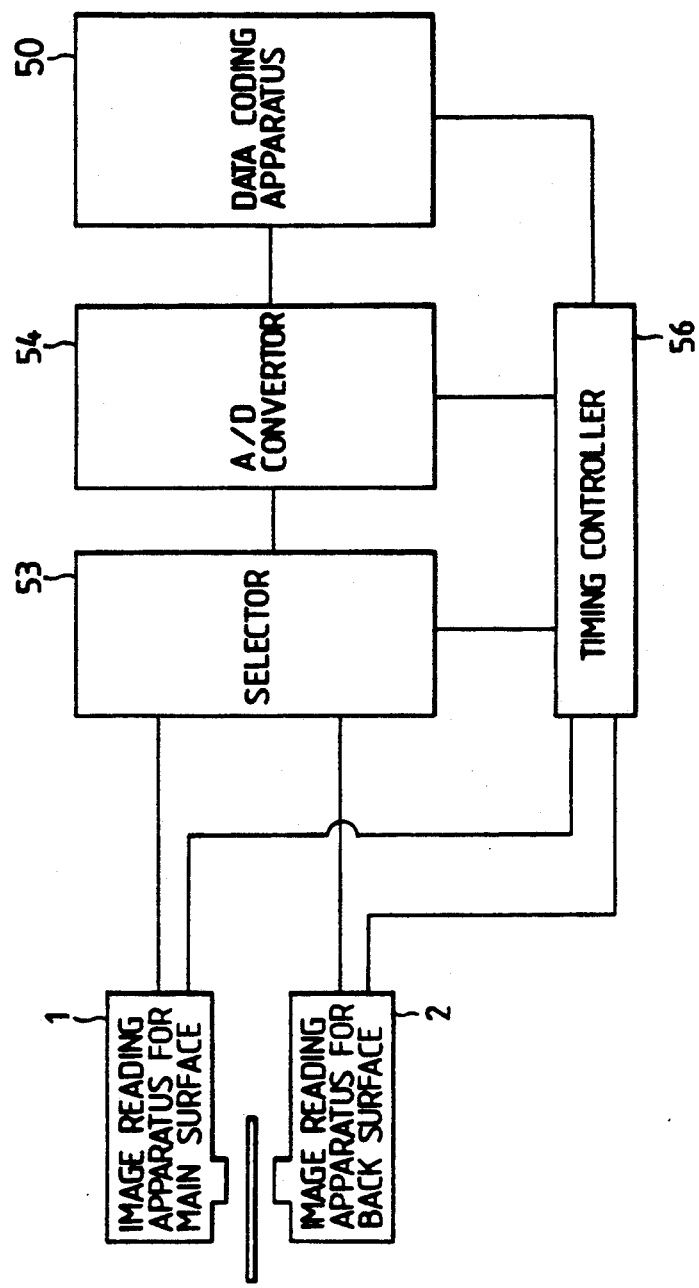
FIG. 17 is a detailed block diagram of the reading control unit according to a third embodiment of this invention.

FIG. 17 is a block diagram showing the structure of the image reading control unit according to the third embodiment of this invention. Elements 1, 2, 53, 54 and 56 have the same structure as the first embodiment, so the description therefor is omitted.

Reference numeral 50 represents a data coding apparatus for coding a digital signal outputted from an A/D converter 54 in accordance with a predetermined coding method.

In this embodiment, a plurality of image data are collectively coded so that the image data cannot be decoded if an operator does not know the decoding method, thereby avoiding fraudulent use of data. In addition, it becomes difficult to separate the image data into main and back surface image data. For example, if only one of the main and back surface image data are coded, the image data of the other surface image can be replaced with other data. However, if the image data of both the surfaces are coded, it is not possible to replace one of the main and back surface image data with other data, thereby making it difficult to alter the data.

In the first and third embodiments, after synthesizing analog image signals, they are converted into digital signals. Alternatively, analog signals from the image reading unit may be converted first into digital signals, and then they are synthesized, while retaining the same advantageous effects.

What is claimed is:

1. An image information processing apparatus comprising:
   a first reading unit for reading a front surface image of an original;
   a second reading unit for reading a back surface image of the original;
   switching means for alternately switching the front surface image read by said first reading unit and the back surface image read by said second reading unit and for outputting a switched image;
   mixing means for serially mixing the front surface image and the back image alternately output by said switching means;
   encoding means for encoding the front surface image and back surface image mixed by said mixing means;
   storing means for storing in a recording medium images encoded by said encoding means;
   read-out means for reading out the images stored in the recording medium;
   decoding means for decoding the images read out by said read-out means and for outputting a mixed image in which the front surface image and the back surface image are mixed; and
   separating means for separating the mixed images output by said decoding means in succession into a front surface image and a back surface image to provide the front surface image for one page and the back surface image for one page.

2. An image formation processing apparatus comprising:
   inputting means for inputting image information relating to front and back surface images of an original, line by line;
   mixing means for mixing one line of the front surface image information of the original and one line of the back surface image information of the original to form one line of mixed image information;
   encoding means for encoding the mixed image information from said mixing means;

storing means for storing in a storage medium the image information encoded by said encoding means;

retrieving means for retrieving the image information stored in said storing means;

decoding means for decoding the image information retrieved by said retrieving means and for outputting a mixed image in which one line of the front surface image and one line of the back surface image are mixed; and separating means for separating the mixed image output from said decoding means in succession, into one line of an image of the front surface and one line of an image of the back surface to provide the front surface image for one page and the back surface image for one page.

3. An image information processing apparatus according to claim 2, further comprising original reading means, for reading the front and back surface image information and providing that information to said inputting means.

4. An image information processing apparatus according to claim 2, further comprising retrieval information generating means for generating retrieval information for the image information input by said inputting means, wherein said retrieval means retrieves the front surface image information and the back surface image information with one retrieval.

5. An image information processing apparatus comprising:

inputting means for inputting image information relating to front and back surface images of an original;

mixing means for mixing the front surface image information and the back surface image information of the original, wherein the front surface image information and the back surface image information are alternately arranged in a predetermined amount of data, said predetermined amount of data being less than an amount of data for one page;

storing means for storing in a recording medium the image information mixed by said mixing means;

read-out means for reading out the image information stored in the recording medium; and separating means for separating the image information read out from said read-out means into the predetermined amount of the front surface image information and the predetermined amount of the back surface image information to provide the front surface image information for one page and the back surface image information for one page.

6. An image information processing apparatus according to claim 5, further comprising outputting means for selectively outputting the front surface image information and the back surface image information separated by said separating means, to selectively display the front surface image information and the back surface image information.

7. An image information processing apparatus according to claim 5, further comprising encoding means for encoding the image information mixed by said mixing means, wherein said storing means stores in the recording medium the image information encoded by said encoding means.

* * * * *

UNITED STATES PATENT AND TRADEMARK OFFICE
CERTIFICATE OF CORRECTION

PATENT NO. : 5,280,545

DATED : January 18, 1994

INVENTOR(S) : RYUICHI MASUDA

It is certified that error appears in the above-indentified patent and that said Letters Patent is hereby corrected as shown below:

COLUMN 1

Line 17, "on" should read --on front--.

COLUMN 2

Line 18, "retrieved;" should read --retrieved; and--.
Line 28, "entirely" should read --entirety--.
Line 61, "original 0" should read --original O--.

COLUMN 3

Line 16, "original 0" should read --original O--.
Line 36, "comparator 7." should read --comparator 57.--.
Line 64, "Method." should read --method.--.

COLUMN 4

Line 30, "(S14)" should read --(S14),--.
Line 61, "front and back" should read --front- and back- --.

UNITED STATES PATENT AND TRADEMARK OFFICE
CERTIFICATE OF CORRECTION

PATENT NO. : 5,280,545
DATED : January 18, 1994
INVENTOR(S) : RYUICHI MASUDA

It is certified that error appears in the above-indentified patent and that said Letters Patent is hereby corrected as shown below:

COLUMN 5

Line 44, "original 0" should read --original O--.
    Line 46, "(S36)" should read --(S36).--.
    Line 61, "image" should read --the image-- and
             "the" should be deleted.

COLUMN 6

Line 28, "processes" should read --process--.

COLUMN 8

Line 5, "is-omitted." should read --is omitted.--.
    Line 40, "back" should read --back surface--.

Signed and Sealed this

Second Day of August, 1994

Attest:

BRUCE LEHMAN

Attesting Officer        Commissioner of Patents and Trademarks